(12) United States Patent
Hutchison

(10) Patent No.: US 6,995,338 B2
(45) Date of Patent: Feb. 7, 2006

(54) METHOD AND APPARATUS FOR SHORT CIRCUIT WELDING

(75) Inventor: Richard M. Hutchison, New London, WI (US)

(73) Assignee: Illinois Tool Works Inc., Glenview, IL (US)

( * ) Notice: Subject to any disclaimer, the term of this patent is extended or adjusted under 35 U.S.C. 154(b) by 271 days.

(21) Appl. No.: 10/404,248

(22) Filed: Mar. 31, 2003

(65) Prior Publication Data

US 2004/0188404 A1 Sep. 30, 2004

(51) Int. Cl.
*B23K 9/10* (2006.01)

(52) U.S. Cl. .......................... 219/137 PS; 219/130.21; 219/137.71

(58) Field of Classification Search ............ 219/137.71, 219/124.34, 130.21, 130.31, 130.32, 130.33, 219/137 PS
See application file for complete search history.

(56) References Cited

U.S. PATENT DOCUMENTS

| | | | |
|---|---|---|---|
| 4,469,933 A | 9/1984 | Mizuno et al. | |
| 4,485,293 A | 11/1984 | Tabata et al. | |
| 4,533,817 A | * 8/1985 | Makimaa | 219/137.71 |
| 4,544,826 A | 10/1985 | Nakanishi et al. | |
| 4,717,807 A | 1/1988 | Parks et al. | |
| 4,866,247 A | 9/1989 | Parks et al. | |
| 4,897,523 A | 1/1990 | Parks et al. | |
| 4,954,691 A | 9/1990 | Parks et al. | |
| 5,003,154 A | 3/1991 | Parks et al. | |
| 5,270,516 A | * 12/1993 | Hamamoto et al. | 219/130.33 |
| 5,349,156 A | * 9/1994 | Madigan et al. | 219/130.01 |
| 6,087,626 A | 7/2000 | Hutchison et al. | |
| 6,160,241 A | 12/2000 | Stava et al. | |
| 6,329,636 B1 | 12/2001 | Geissler | |

FOREIGN PATENT DOCUMENTS

JP 58-84678 A * 5/1983

* cited by examiner

*Primary Examiner*—Clifford C. Shaw
(74) *Attorney, Agent, or Firm*—George R. Corrigan

(57) ABSTRACT

A method and apparatus for short circuit welding includes providing welding power suitable for short circuit welding, sensing the stick out length, and adjusting the welding speed, such as wire feed speed or travel speed, adjusting a welding parameter, or adjusting thee gas mixture in response thereto. Stick out is preferably determined by measuring a welding parameter, and performing an FFT on the parameter, and then calculating stick out, in one embodiment. Stick out can be either CTTWD or CPTPD. The system can determine when a short is about to clear by calculating a value $V_c$ defined by $V_c=d/dt(kI*dp/dt)$, and comparing $V_c$ to a $V_{threshhold}$, which varies in response to welding cycle history.

25 Claims, 2 Drawing Sheets

METHOD AND APPARATUS FOR SHORT CIRCUIT WELDING

FIELD OF THE INVENTION

The present invention relates generally to the art of welding. More specifically, it relates to short circuit welding.

BACKGROUND OF THE INVENTION

There are many types of welding power supplies and welding processes. One welding process is referred to as short circuit transfer welding. Short circuit transfer welding generally consists of alternating between an arc state and a short circuit, non-arc state. During the arc state the wire melts, and during the short circuit state the metal further melts and the molten metal is transferred from the end of the wire to the weld puddle. The metal transferred in one cycle is referred to herein as a drop, regardless of the size or shape of the portion of metal that is transferred.

Short circuit transfer welding has many advantages, such as shorter arc length and less melting of the base plate. However, short circuit transfer welding has disadvantages, such as increased spatter.

Both the power source topology and the control scheme must be considered when designing a short circuit transfer welding power source. The power topology used must be fast enough to have a timely response to the chosen control scheme. The control should address three considerations: First, arc length must be properly controlled. Second, the burn-off (or mass deposition) rate must be appropriately controlled. Inappropriate burn-off rate will result in increased spatter. Third, spatter is also caused by too much power when the short is cleared, i.e., the transition from a short circuit to an arc. Thus, the power or current when the short clears must also be controlled. Also, when the short is about to clear must be detected. Some prior art patents do not teach control of the short circuit transfer welding process on a short circuit by short circuit basis. Such a control will provide more precise control of the welding process and will help to reduce spatter.

One common prior art power source topology uses secondary switchers to control the output. While these may provide fast control, they may be relatively expensive or have insufficient peak current capacity. Also, switching high current may increase reliability problems and switching losses. Examples of patents that have secondary switchers include: U.S. Pat. No. 4,469,933, entitled Consumable Electrode Type Arc Welding Power Source, issued Sep. 4, 1984; U.S. Pat. No. 4,485,293, entitled Short Circuit Transfer Arc Welding Machine, issued Nov. 27, 1984; U.S. Pat. No. 4,544,826 entitled Method and Device For Controlling Welding Power Supply to Avoid Spattering of the Weld Material, issued Oct. 1, 1985; U.S. Pat. No. 4,717,807, entitled Method and Device For Controlling a Short Circuiting Type Welding System, issued Jan. 5, 1988.

The control scheme in many prior art power supplies uses arc voltage to determine if arc length is proper. Typically, if the arc voltage is less than a setpoint, the arc length is determined to be too short, and if the arc voltage is greater than the setpoint, arc length is determined to be too long. The output current is controlled to either increase or decrease the amount of metal melted per short-arc cycle, thus controlling the arc length. Some prior art short circuit transfer welding patents taught control of the mass deposition (burn-off) rate by controlling the welding power by "totalizing" the energy delivered to the arc. Arc or welding power is a function of arc current and arc voltage.

However, the burn-off rate on a short-by-short basis (i.e. for any given short circuit transfer welding cycle) is largely independent of arc voltage—it is predominantly a function of arc current. Thus, prior art control schemes that use arc power (or arc energy) to control the burn-off rate are complex and inaccurate. Example of such complex and inaccurate control schemes include: U.S. Pat. No. 4,866,247, entitled Apparatus and Method of Short Circuiting Arc Welding, issued on Sep. 12, 1989; U.S. Pat. No. 4,897,523, entitled Apparatus and Method of Short Circuiting Arc Welding, issued on Jan. 30, 1990; U.S. Pat. No. 4,954,691, entitled Method and Device For Controlling A Short Circuit Type welding System, issued on Sep. 4, 1990; and U.S. Pat. No. 5,003,154 entitled Apparatus and Method of Short Circuiting Arc Welding, issued on Mar. 26, 1991. Some of these prior art patents teach control of the power when a short is clearing by predicting the clearing of the short. They generally compare arc voltage or its first derivative to a threshold. However, the prior art attempts result in missed or false short clearing predictions.

Accordingly, a short circuit transfer welding power supply that adequately controls the burn-off rate, preferably on a short-by-short basis, is desired. Preferably, the process should be controlled such that power is reduced when the short is clearing. Also, the power source used should be sufficiently fast to respond to the control, but not unduly expensive or limited in peak output current.

One of the causes of instability in a short circuit transfer welding process relates to excessive pre-heating of the wire. Variations in the wire/puddle interaction caused by operator movement and/or changing puddle geometry, can result in irregular pre-heating of the wire due to $I^2*R$ heat generation. Too much pre-heating of the wire can cause the melting rate of the wire to increase to a point where the molten ball grows very quickly following the transition from a short to an arc. This quick melting, known as a flare-up, results in a rapid increase in arc length with a corresponding voltage increase.

The opposite extreme can also occur. If there is insufficient pre-heating of the wire, the short circuit frequency will increase as subsequent arc times become shorter. If energy is not added quickly enough, the wire can eventually "stub" into the puddle. The end result of such stubbing is either an explosive short clearing, or a sustained short circuit with no arc (sometimes called noodle welding). Over and under preheating often occur in a cyclic fashion. Unfortunately, most prior art controls adjust after a stub or flare-up has occurred. For example, when the control causes the heat to decrease to compensate for past pre-heating, the process has already cycled to the under-heating stage. Thus, the control actually exacerbates the problem.

Many of the problems with the aforementioned systems were addressed by U.S. Pat. No. 6,087,626, Method and Apparatus for Welding, Hutchison, et al., Jul. 11, 2000, hereby incorporated by reference. While that system performs much better than the prior art, a system that improves upon the '626 system is desirable. Accordingly, it is desirable to have a short circuit transfer welding process that more accurately compensates for the pre-heating of the wire.

SUMMARY OF THE PRESENT INVENTION

According to a first aspect of the invention a method and apparatus for short circuit welding includes providing welding power suitable for short circuit welding, sensing the stick out length, and adjusting the welding speed, such as wire feed speed or travel speed, adjusting a welding parameter, or adjusting the gas mixture in response thereto.

Stick out is determined by measuring a welding parameter, and performing an FFT on the parameter, and then calculating stick out, in one embodiment. Stick out can be either CTTWD or CPTPD.

According to a second aspect of the invention, a method and apparatus for short circuit welding includes determining when a short is about to clear and calculating a value $V_c$ defined by $V_c=d/dt(kl*dp/dt)$, and comparing $V_c$ to a $V_{threshold}$.

$V_{threshold}$ varies in response to welding cycle history, including as a function, such as an average, of the time from crossing $V_{threshold}$ to the short actually clearing in past welding cycles, in various embodiments.

A comparison is made between dv/dt and threshold after $V_c$ crosses a $V_{threshold}$, and the controller determines that a short is about to clear in response to the comparison in another embodiment.

According to a third aspect of the invention, a method and apparatus for short circuit welding wherein the waveform has at least a more rapidly increasing current segment that terminates at a termination current magnitude, and a less rapidly increasing current segment during a short phase. The current magnitude that the rapidly increasing portion terminates at is reduced in response to welding cycle history.

The reducing is done in response to a function, such as an average, of the time from determining when the short was going to clear to the short actually clearing in past welding cycles, according to various embodiments.

According to a fourth aspect of the invention, a method and apparatus for short circuit welding, wherein the current increases prior to the short clearing, includes determining a value $V_c$ defined by $V_c=d/dt(kl*dp/dt)$, and comparing $V_c$ to a $V_{threshold}$, and inhibiting the comparison until current is increasing before the short clearing.

According to a fifth aspect of the invention, a method and apparatus for determining the length of stick out, includes determining a desired mass deposition rate error and comparing the error to known values.

Other principal features and advantages of the invention will become apparent to those skilled in the art upon review of the following drawings, the detailed description and the appended claims.

Figure 1:
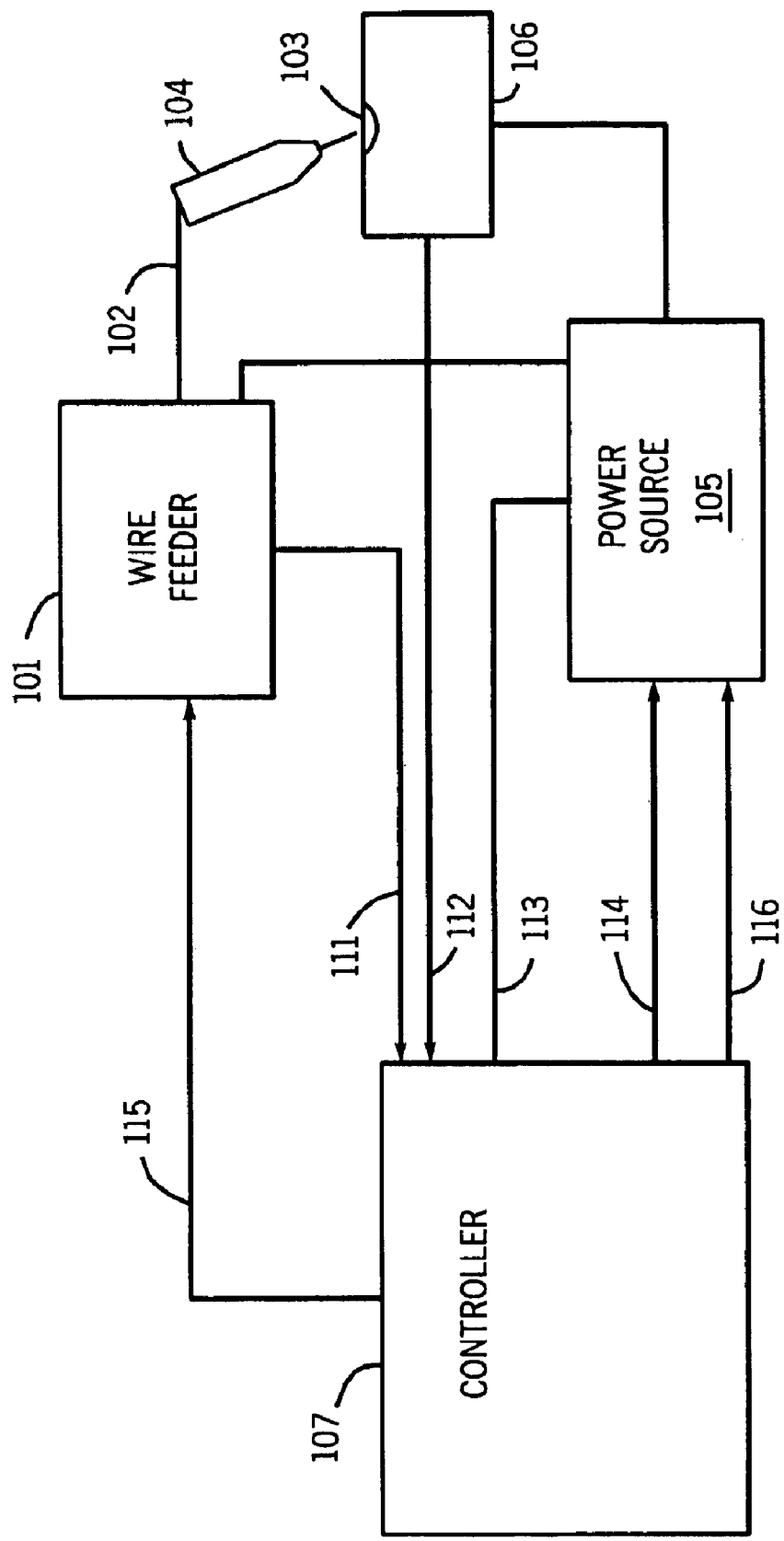
FIG. 1 is block diagram of a system in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a preferred control scheme, a preferred control circuit, a preferred power source and illustrative waveforms, it should be understood at the outset that the invention is not limited to the components described herein. Other circuitry and control schemes may be employed while implementing this invention.

A method and apparatus for controlling a short circuit (MIG) welding process is described herein. A wire electrode is mechanically fed into the weldment at a rate by a wire feeder in the short circuit transfer welding process. It is consumed into the weldment via a series of alternating short circuit and arc events. This process is generally referred to as short circuit welding, or short circuit transfer welding. Generally, a welding machine used for short circuit welding includes at least a power source, a controller and a wire feeder.

The short circuit transfer welding process is cyclical. One cycle of the process, as described herein, begins with the beginning of a steady state arc, followed by a short circuit condition, and is completed with the beginning of another steady state arc condition. A typical cycle length is 10 msec. The electrode, and a portion of the base metal, are melted during the short circuit transfer welding process by current flowing through the electrode to the weldment. Generally, a portion of the wire material melts during the arc condition, and is transferred during the short condition.

The preferred embodiment is generally implemented using the system of U.S. Pat. No. 6,087,626. More specifically, FIG. 1 is a block diagram of a short circuit transfer welding system that implements the present invention. Generally, a wire feeder 101 provides a wire 102 through a welding torch 104 to a weldment 103. A power source 105 provides power to welding torch 104 and a workpiece 106. A controller 107 includes a microprocessor (or a DSP or other integrated circuit in alternative embodiments), and/or a discrete circuit. Controller 107 may be part of power source 105, part of wire feeder 101, power source 105 may have a separate controller, or controller 107 may directly control the power converting of power source 105.

The preferred control scheme uses a current command signal to drive the output current. The command signal is comprised of multiple components. One component sets the long-term current command level (called the long-term current command). Another component adjusts the current command on a real-time or short-by-short basis (called the short-by-short current command).

Arc voltage feedback is used to determine if the desired arc length is present and to adjust the long-term command on a short-by-short basis. The short-by-short current command is derived from real-time arc current and voltage feedback (rather than power) and is used to control the burn-off rate by an instantaneous, or short-by-short, adjustment of the current command. The preferred control scheme also uses a function of the time derivative of arc power (less the time derivative of arc current) to detect, in real time, when the short is about to clear.

The preferred embodiment uses a power source such as that shown in U.S. Pat. No. 6,329,636, Method and Apparatus for Receiving a Universal Input Voltage in a Welding Plasma or Heating Power Source (hereby incorporated by reference) which has the capability to change its' output current very rapidly, on the order of 1000 amps/msec.

The wire burn-off rate is controlled by controlling the current on a short circuit-by-short circuit basis (or period-by-period basis). This short-by-short current control is combined with the current control set by arc voltage (to obtain a desired arc length). The power source and controller of the preferred embodiment are sufficiently fast to provide the desired current in much less than one weld cycle.

Thus, two control loops are in simultaneous use—an arc length loop using arc voltage as feedback to set a long-term current command, and a wire burn-off loop using arc current and voltage as feedback to set a short-by-short command. The two loops are weighted differently in the preferred embodiment. Both arc voltage and arc current are used to detect, in real time, the short-clearing, and to terminate the process, as described below.

Figure 2:
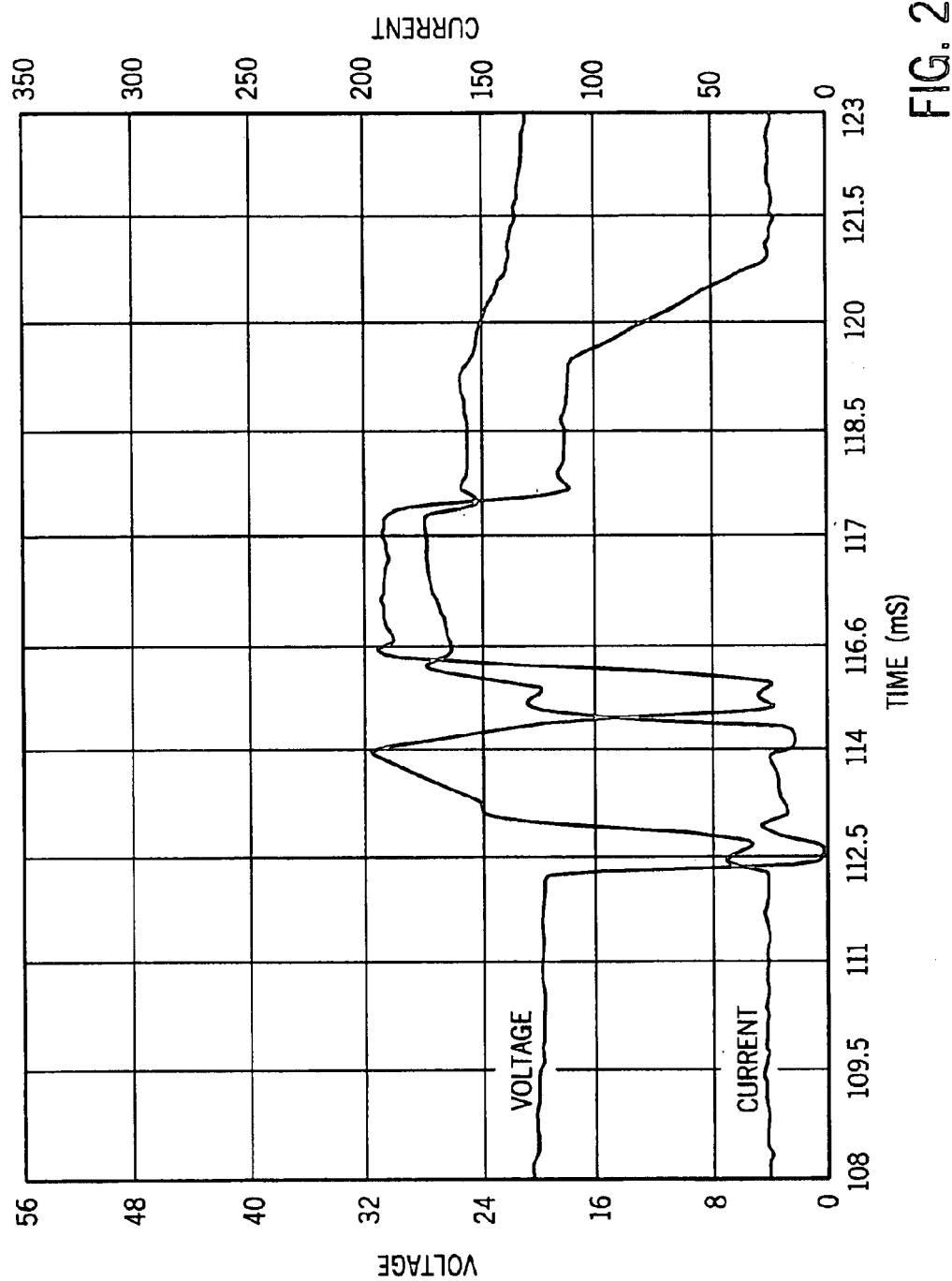
FIG. 2 is wave form in accordance with the present invention.

The waveform generally follows that of the '626 patent, and will not be described herein except as necessary. FIG. 2 is a graph of current and voltage in accordance with the present invention. A background current flows during an arc phase. When a short circuit is established, the current is commanded to a higher level along a rapidly increasing segment. The rapidly increasing segment is followed by a plateau, which is followed be a more slowly increasing segment. The plateau is omitted in some embodiments, or one or more cycles. When the short is about to clear the current is quickly lowered to a background level. After the arc is established the current is commanded to a high level. The high current level during the arc phase is ended by decreasing the current as fast as possible to a plateau, and then after the plateau more gradually decreasing the current to the background level. The plateau may be omitted in some embodiments, or for some cycles. The various current magnitudes and durations are controlled in a manner consistent with the prior art, except as set forth herein, to provide a robust and repeatable process.

One aspect of the invention provides for the point at which the rapidly increasing segment ends to be adjusted due to past history of the process or welding cycle history. Welding cycle history, as used herein, includes parameters of past welding cycles, including functions thereof. More specifically, the time from when the indication of the short clearing (dp/dt as set forth below) is received, until the short clears (precursor time) can be monitored. A running average can be used to end the rapidly increasing segment earlier or later. Also, it can be ended earlier when a prior short (or shorts) cleared before the current could be lowered. The end of the segment can be based on time, current, voltage, power, or functions thereof crossing a threshold. Also, the overall process can be controlled using precursor time as one of the feedback parameters.

As is known in the art, it is desirable to reduce the current prior to the short clearing. The present invention uses more information than can be obtained from the voltage waveform alone to quickly and consistently detect the imminent short clearing. More specifically, controller 107 uses, in one embodiment of the invention, the second derivative of the power to detect the short clearing event, in real time. Controller 107 solves an equation $V_c = d/dt(dP/dt)$, in real time. When $V_c$ crosses $V_{threshold}$ controller 107 determines, in real time, that the short is about to clear. Alternatives includes using other functions of dP/dt, using functions of $dV_c/dt$ instead of or with dP/dt, as well as using dR/dt, or higher order derivatives of these parameters, or other functions of these parameters, and combinations thereof. The equation may be implemented with discrete circuitry, or using a microprocessor, DSP, etc, in a well known manner.

According to another alternative $V_{threshold}$ is varied in response to past history of the process. For example, in one embodiment, a running average of the time between the crossing the $V_{threshold}$ and the actual short clearing for a number of weld cycles is calculated and used to adjust $V_{threshold}$. Other functions of the time are used in other embodiments.

Avoiding false short detections can be enhanced by monitoring the welding parameters after $V_{threshold}$ is crossed. The inventor has determined that when a valid dP/dt is determined, the voltage waveform is either flat or slightly decreasing because the resistance increase due to the necking down of the of the molten bridge is greater than the decrease in voltage due to falling current. However, this is not true for a false positive dP/dt. Thus monitoring dV/dt for a negative slope after $V_c$ has been crossed can indicate a false positive. Accordingly, the controller indicates a short is about to clear when $V_{threshold}$ is crossed and the current is abruptly reduced, and when dV/dt is not negative.

According to yet another embodiment, the detection of the short about to clear is inhibited until the process is close to where the short will clear. For example, it can be inhibited until the process reaches the start of the rapidly increasing segment, the end of the rapidly increasing segment, or after the plateau of the short phase.

It is known that a long arc time results in a long transit time of the wire back to the puddle. During this transit time, the current is low, and therefore, the $I^2*R$ heating at the contact area in the contact tube is low. This produces a relative cold spot in the wire which begins to travel toward the puddle. As this cold region of wire approaches the weld puddle, the size of the molten ball formed after the short clears, decreases. Also, the time spent in the arc mode decreases. This shift in time from the arc to short circuit increases the overall $I^2*R$ heating of the wire. This increased $I^2*R$ heating produces a localized hot spot in the wire near the contact tube, bringing the cycle back to the beginning. Thus, this process may be cyclic in nature.

The frequency of this cyclic phenomenon is related to a number of factors. Chief among these are the stick out length, or more precisely contact point to puddle distance (CPTPD). Contact point, as used herein, is the point at which electrical contact is made between the output power and the welding wire. Prior art schemes, to the extent they considered stick out, used contact tip to work distance (CTTWD). The system described herein will be described with reference to stick out, CPTPD, or CTTWD, since, while CTPTD is most desirable, the invention may be implemented, albeit less effectively, using CTTWD.

The fundamental frequency of oscillation of the cyclic process may be obtained by performing an FFT on an welding parameter such as current, voltage, power, or functions thereof. Welding parameter, as used herein, includes output current, voltage, power, welding speed, etc. Given the frequency from the FFT, the CPTPD may be determined as the inverse of the transit time of a section of wire equal to the length of the stick out, traveling at a velocity equal to the wire feed speed. It should be noted that higher modes of this fundamental frequency could conceivably be excited.

A desirable process provides for a constant CPTPD or stick out. Given the ability to sense the stick out quickly and accurately, the process may be controlled to maintain a constant CPTPD. For example, welding speed (more particularly wire feed speed or travel speed) can be adjusted in response to the calculated stick out or CTPTD. Welding speed, as used herein, includes the wire feed speed and the travel speed of the welding gun. Also, the shielding gas mixture can be controlled in response to CPTPD.

Additionally, welding parameters may be controlled in response to CTPTD. A preferred control provides for controlling welding current in response to CPTPD, preferably determined using an FFT of a welding parameter. Another alternative provides for determining stick out by comparing the mass burn-off rate to a desired mass burn off rate, and determining an error. The error is compared the error to known values to determine the stick out, because stick out is dependent on the mass burn-off rate error.

Numerous modifications may be made to the present invention which still fall within the intended scope hereof. Thus, it should be apparent that there has been provided in accordance with the present invention a method and apparatus for short circuit welding that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A method of short circuit welding, comprising:
   providing welding power suitable for short circuit welding;
   sensing an output parameter and determining the stick out length in response to a frequency of the output parameter; and
   adjusting the welding speed in response to the sensed stick out length.

2. The method of claim 1, wherein adjusting includes adjusting travel speed.

3. The method of claim 1, wherein stick out is contact point to puddle distance.

4. The method of claim 1, wherein stick out is contact tip to work distance.

5. A method of short circuit welding, comprising:
   providing welding power suitable for short circuit welding;
   sensing the stick out length; and
   adjusting the welding speed in response to the sensed stick out length, wherein adjusting includes adjusting a wire feed speed.

6. A method of short circuit welding, comprising:
   providing welding power suitable for short circuit welding;
   sensing the stick out length; and
   adjusting the welding speed in response to the sensed stick out length;
   wherein sensing comprises:
   measuring a welding parameter;
   performing an FFT on the parameter; and
   calculating stick out.

7. A method of short circuit welding, comprising:
   providing welding power suitable for short circuit welding;
   sensing the stick out length; and
   adjusting the welding gas mixture in response to the sensed stick out length.

8. The method of claim 7, wherein sensing comprises:
   measuring a welding parameter;
   performing an FFT on the parameter; and
   calculating stick out.

9. The method of claim 8, wherein stick out is contact point to puddle distance.

10. A method of controlling a short circuit welding process, comprising:
    sensing the contact point to puddle distance; and
    adjusting at least one welding parameter in response to the contact point to puddle distance,
    wherein sensing comprises measuring a welding cycle frequency and performing an FFT on the frequency.

11. The method of claim 10, wherein adjusting includes adjusting the welding current.

12. The method of claim 11, wherein adjusting includes adjusting the welding speed.

13. A system for short circuit welding, comprising:
    a short circuit welding power source; and
    a controller, connected to the power source,
    including a stick out length sensor responsive to a frequency of an output parameter, and
    a speed adjuster, responsive to the stick out length sensor.

14. The system of claim 13, wherein the speed adjuster has a travel speed control output.

15. A system for short circuit welding, comprising:
    a short circuit welding power sources; and
    a controller, connected to the power source,
    including a stick out length sensor, and
    a speed adjuster, responsive to the stick out length sensor, wherein the speed adjuster has a wire feed speed control output to a wire feeder.

16. A system for short circuit welding, comprising;
    a short circuit welding power source; and
    a controller, connected to the power source,
    including a stick out length sensor, and
    a speed adjuster, responsive to the stick out length sensor, wherein the sensor include a welding parameter feedback input, and an FFT module connected to the feedback input.

17. A system for short circuit welding, comprising:
    a source of gas disposed to provide gas to the weld,
    a short circuit welding power source, disposed to provide power to the weld; and
    a controller, connected to the source of gas, including
    a stick out length sensor, and
    a gas mix control output, responsive to the stick out length sensor, and connected to the source of gas.

18. The method of claim 17, wherein the sensor includes a welding parameter feedback input, and an FFT module connected to the feedback input.

19. The method of claim 17, wherein the sensor includes a welding current feedback input, and an FFT module connected to the feedback input.

20. A system for short circuit welding, comprising:
    means for providing welding power suitable for short circuit welding, disposed to provide power to a weld;
    means for sensing the stick out length in response to a frequency of an output parameter, connected to the means for providing power; and
    means for adjusting the welding speed in response to the sensed stick out length, connected to the means for sensing.

21. A system for short circuit welding, comprising:
    means for providing welding power suitable for short circuit welding, disposed to provide power to a weld;
    means for sensing the stick out length, connected to the means for providing power; and
    means for adjusting the welding speed in response to the sensed stick out length, connected to the means for sensing, wherein the means for sensing includes means for measuring a welding parameter, means for performing an FFT on the parameter, and means for calculating stick out.

22. A system for short circuit welding, comprising:

means for providing welding power suitable for short circuit welding;

means for sensing the stick out length, connected to the means for providing; and means for adjusting the welding gas mixture in response to means for sensing, connected to the means for sensing.

23. The system of claim 22, wherein
the means for sensing includes means for measuring a welding parameter, means for performing an FFT on the parameter, and means for calculating stick out.

24. A system for controlling a short circuit welding process, comprising:

means for sensing the contact point to puddle distance, responsive to a frequency of an output parameter; and means for adjusting at least one welding parameter in response to the contact point to puddle distance, connected to the means for sensing;

wherein the means for sensing includes means for measuring a welding cycle frequency and means for performing an FFT on the frequency.

25. The system of claim 24, wherein the means for adjusting includes meas for adjusting the welding current.

* * * * *